June 30, 1959  D. W. McARTHUR  2,892,295
FILM INSERTING APPARATUS
Filed Feb. 19, 1954  4 Sheets-Sheet 1
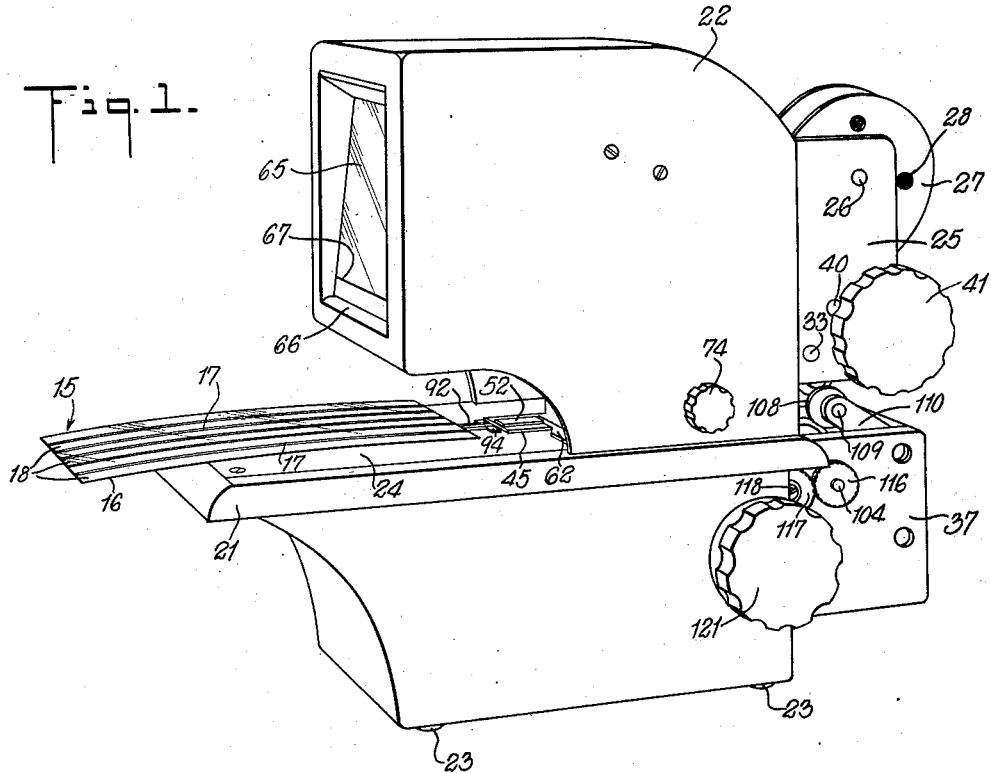
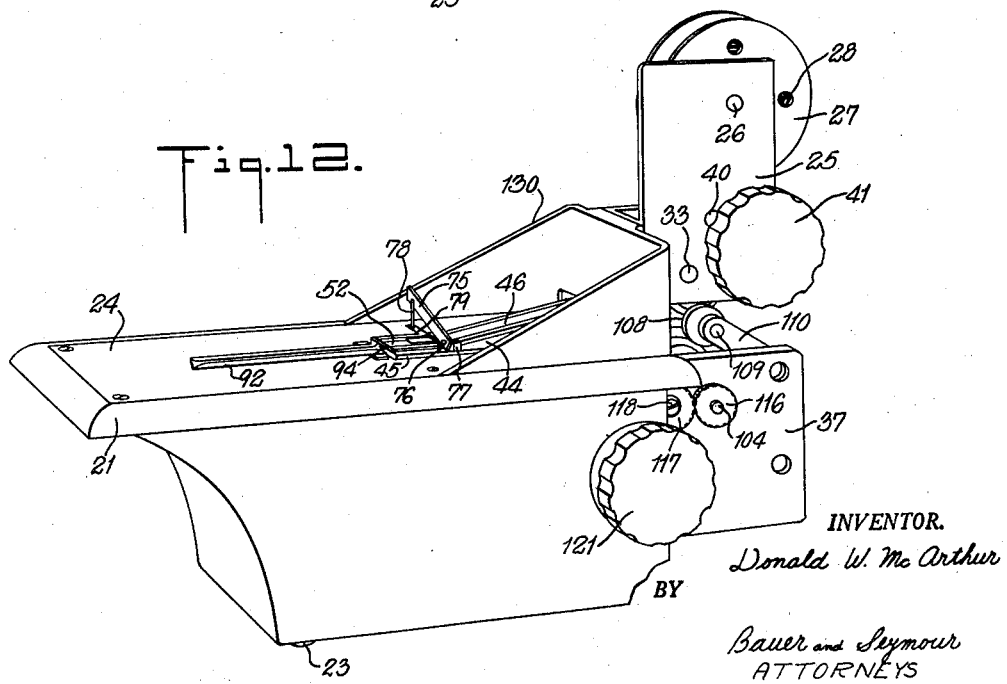
INVENTOR.
Donald W. McArthur
BY Bauer and Seymour
ATTORNEYS June 30, 1959  D. W. McARTHUR  2,892,295
FILM INSERTING APPARATUS
Filed Feb. 19, 1954  4 Sheets-Sheet 2
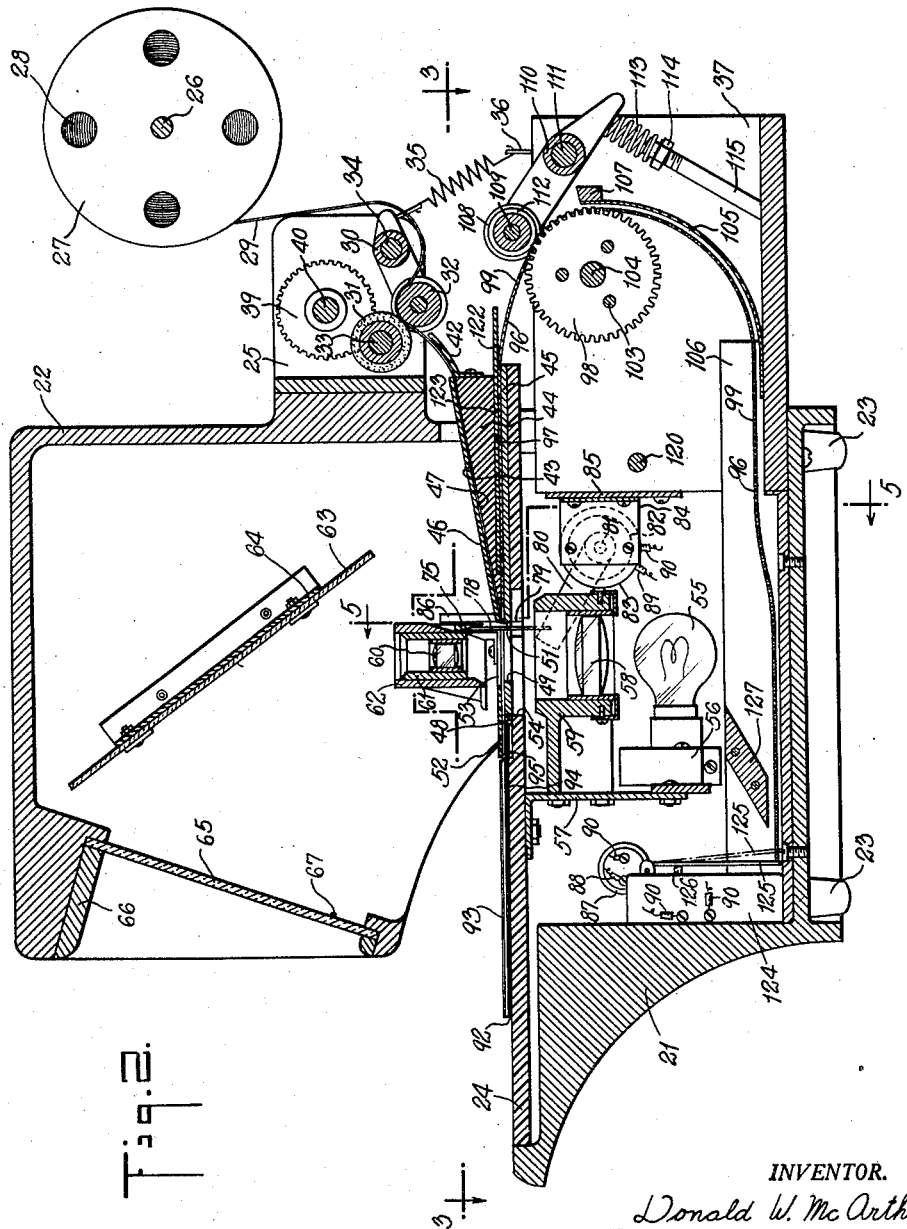
INVENTOR.
Donald W. McArthur
BY
Bauer and Seymour
ATTORNEYS

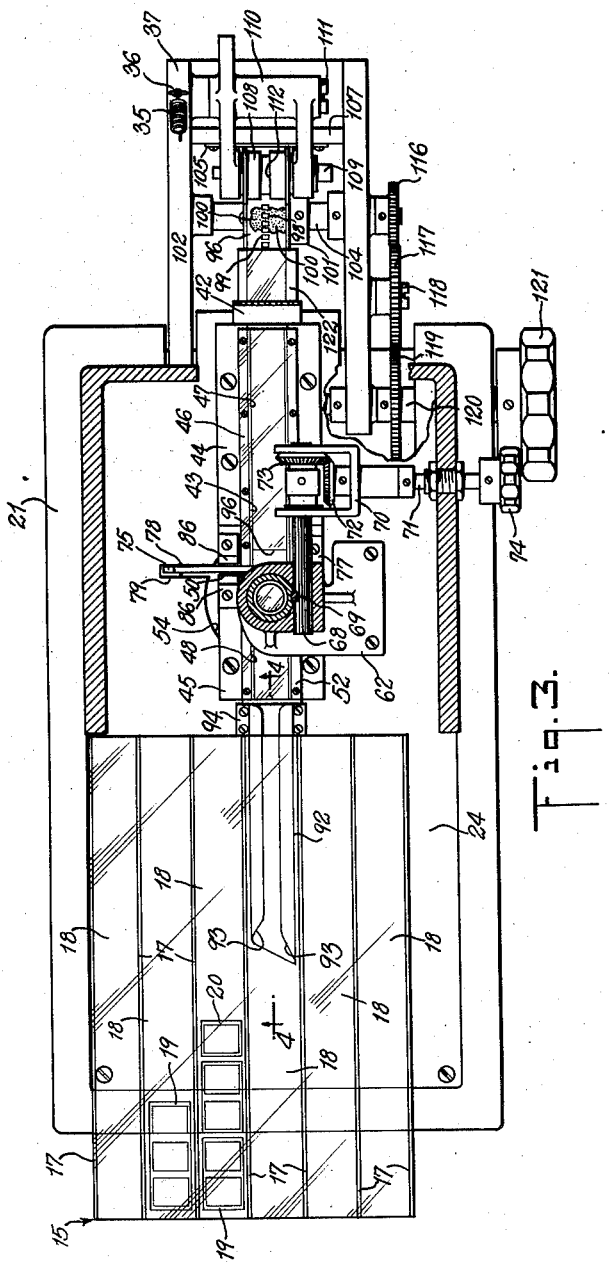
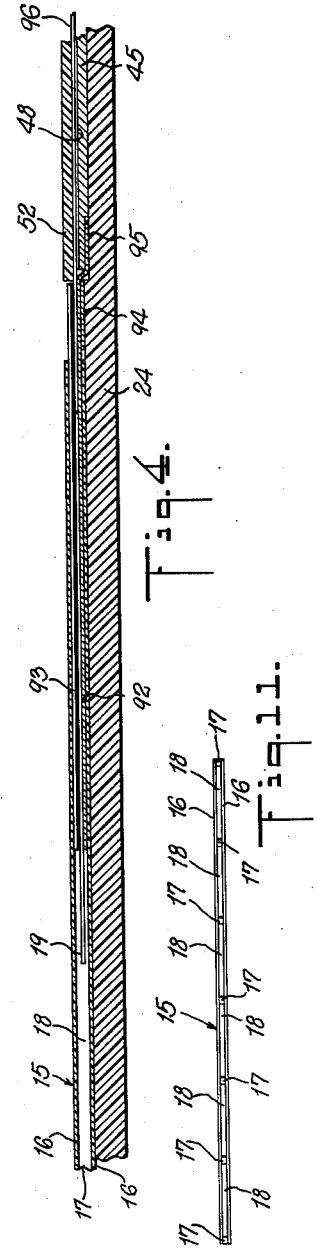
INVENTOR.
Donald W. McArthur
BY
Bauer and Seymour
ATTORNEYS.

June 30, 1959 D. W. McARTHUR 2,892,295
FILM INSERTING APPARATUS
Filed Feb. 19, 1954 4 Sheets-Sheet 4
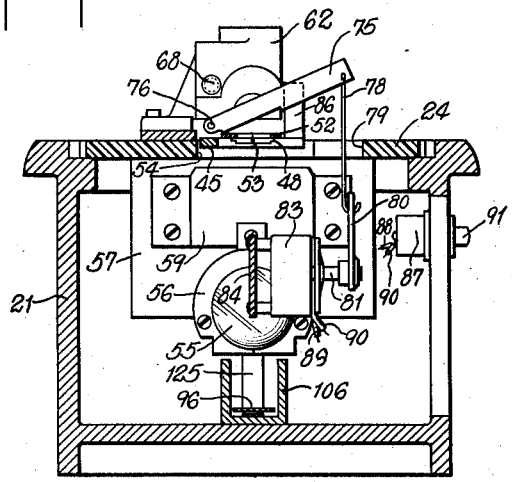
Fig.5.
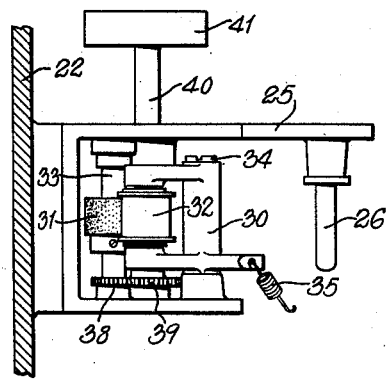
Fig.6.
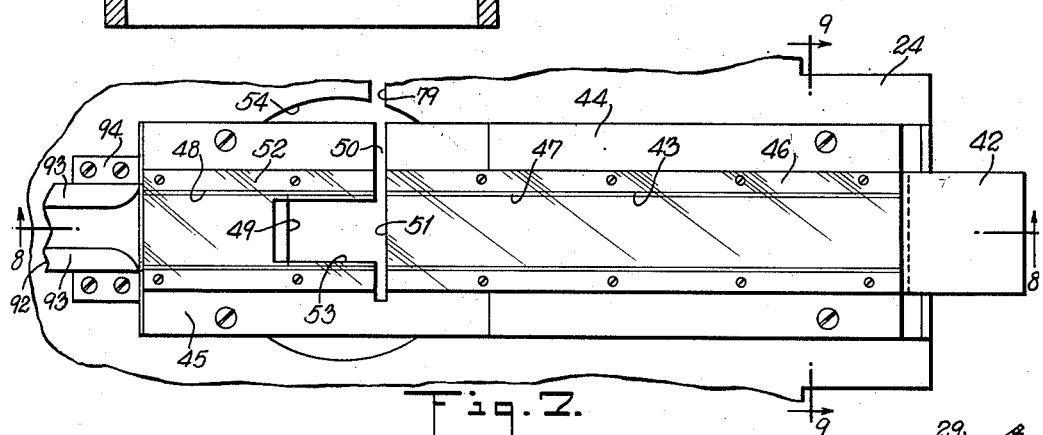
Fig.7.
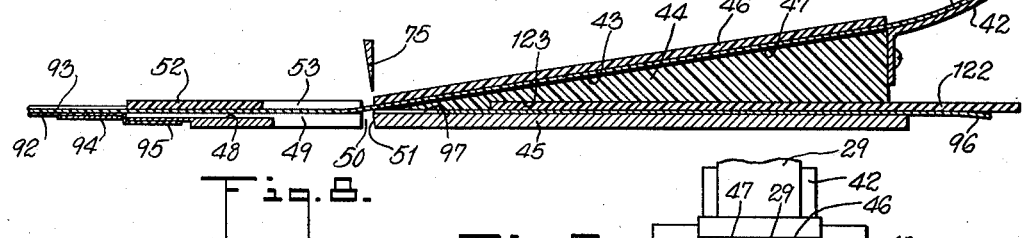
Fig.8.
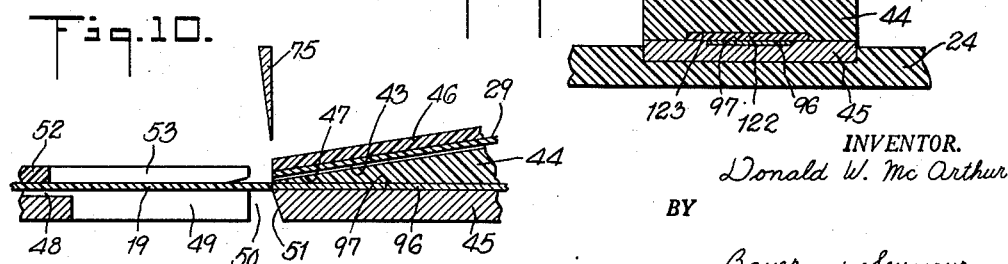
Fig.9.
Fig.10.
INVENTOR.
Donald W. McArthur
BY
Bauer and Seymour
ATTORNEYS

United States Patent Office 2,892,295
Patented June 30, 1959

2,892,295
FILM INSERTING APPARATUS

Donald W. McArthur, Pearl River, N.Y., assignor, by mesne assignments, to Miehle-Goss-Dexter, Incorporated, a corporation of Delaware Application February 19, 1954, Serial No. 411,448

12 Claims. (Cl. 53—123)

This invention relates generally to the filing, indexing and classifying of photographic film which, for this purpose, is inserted into cards and card-like structures provided with one or more elongated pockets for reception of said film therein. More particularly, the invention relates to apparatus for inserting such film into such cards and card-like structures.

One of the objects of the present invention is to materially facilitate and expedite the inserting of individual frames and strips of photographic film into pocket type cards and card-like structures by performing this operation mechanically through the provision of novel, simple and effective apparatus for this purpose.

Another object of the invention is to provide novel and highly efficient apparatus for severing individual frames and strips of photographic film from a supply length thereof and inserting said strips and frames into pocket type cards and card-like structures in an economical and practical manner and at minimum expense.

Another object is to provide novel apparatus of the character and for the purpose above described wherein the exposures or images on the film may be viewed for selection and identification purposes prior to severance of the film frames or strips from the supply length thereof.

Another object is to provide novel apparatus of the character and for the purpose above described wherein the exposures or images on the film may be projected and magnified on a screen for viewing, examining, identifying and selection purposes prior to severance of the film frames or strips from the supply length thereof.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a perspective view of a film inserting apparatus constituting one embodiment of the present invention, said view showing in film receiving position one form of pocket type card which is adapted to be utilized in said apparatus;

Fig. 2 is a vertical longitudinal sectional view of said film inserting apparatus, with the film receiving card omitted for purposes of clearer illustration;

Fig. 3 is a horizontal sectional view taken substantially on the irregular line 3—3 of Fig. 2, with the film receiving card included and shown in film receiving position, and with portions of certain of the parts broken away for purposes of clearer illustration;

Fig. 4 is a fragmentary vertical longitudinal sectional view taken substantially on the line 4—4 of Fig. 3, drawn to an enlarged scale and showing a severed strip of film being inserted into the card;

Fig. 5 is a vertical transverse sectional view taken substantially on the irregular line 5—5 of Fig. 2;

Fig. 6 is a detail bottom plan view, partly in section, of the film feeding means shown in Fig. 2, the film supply and reel therefor being omitted for purposes of clearer illustration;

Fig. 7 is a detail top plan view on an enlarged scale of the structure shown in Figs. 2 and 3 for supporting and guiding the film into cutting and card inserting positions, and for supporting and guiding the film pusher into position to engage and insert a severed film frame or strip into the card;

Fig. 8 is a vertical longitudinal sectional view on the line 8—8 of Fig. 7 and showing the film pusher in its normal retracted position, and the film in position for severance of a frame or strip therefrom;

Fig. 9 is a vertical transverse sectional view substantially on the line 9—9 of Fig. 7;

Fig. 10 is a fragmentary sectional view similar to Fig. 8, but on a still larger scale and showing the film pusher or inserter engaged with and acting on a severed film frame or strip;

Fig. 11 is an end elevational view of the pocket type card shown in Fig. 3, drawn to a slightly enlarged scale; and Fig. 12 is a perspective view of a film inserting apparatus constituting another embodiment of the present invention.

Referring first to Figs. 3 and 11 of the drawings, there is shown, for purposes of illustration only, one form of a card-like pocket type film holder, indicated generally at 15, which is commercially available and is particularly designed for the purpose of receiving therein several relatively long strips of photographic micro-film or the equivalent thereof in individual frames or shorter strips and individual frames of such film, whereby said film may be conveniently filed, indexed and classified as to subject matter, and may be conveniently projected onto a screen without necessitating removal of the film from the card or holder. As shown, the card 15 comprises two alike rectangular sheets 16 of clear transparent cellulose acetate material disposed in face-to-face relation, and a plurality of relatively thin, long and narrow plastic strips 17 disposed between said sheets at the longitudinal edges thereof and in spaced parallel relation between said edges. The sheets 16 and strips 17 are firmly bonded together, and said strips serve to hold said sheets in spaced relation and to form with and between said sheets a plurality of parallel film receiving pockets 18 opened at opposite ends thereof and extending the entire length of said sheets. In the use of the cards 15, strips 19 and/or individual frames 20 of photographic micro-film are severed from a supply length of such film and inserted into selected pockets 18 of said cards for the purpose above described.

Referring now in detail to Figs. 1 to 10, inclusive, of the drawings, there is shown one embodiment of a film inserting apparatus constructed in accordance with the present invention, which is particularly adapted for cutting individual frames and strips of photographic microfilm from a supply length thereof and effectively inserting the severed film frames and strips with a minimum amount of time and effort into selected pockets 18 in the cards 15, said apparatus advantageously including projector means whereby the exposures or images on the film may be conveniently projected and magnified on a screen for viewing, examining, identification, and selection purposes before the film is severed into individual frames or strips. It is to be understood that the use of the novel film inserting apparatus is not limited to the type of multi-ply card or planar film holder constructed as herein illustrated and hereinbefore described, but that said apparatus may also be used with equal advantages and results with cards, jackets, envelopes and other planar holders of multi-ply construction providing a pocket therein which is opened or openable at least at one end and is capable of receiving a film frame or strip therein. Additionally, the present invention comprehends the use thereof for inserting frames and strips of still and motion picture film, pictures and the like between separable or spaced plies of multi-ply planar articles for various purposes.

In the embodiment shown in Figs. 1 to 10, inclusive, the novel film inserting apparatus comprises a rectangular box-like base 21 (Figs. 1, 2, 3 and 5) opened at the top and rear thereof and on and within which the various parts of said apparatus are mounted, including a hood 22 which is bolted or otherwise suitably secured to the upper surface of said base. The base 21 is provided on the underside thereof with a plurality of rubber friction feet 23 which support the apparatus on a table, desk, bench or the like. The base 21 is closed at the top thereof by a plate 24 which is completely embedded in the upper surface of said base and is bolted or otherwise suitably secured thereto. The plate 24 is preferably, but not necessarily, formed of an opaque plastic material, such as Tenite or Plexiglas, and serves as a table for supporting the cards 15 in film receiving position, and for supporting certain elements of the apparatus to be hereinafter described.

Bolted or otherwise suitably secured to the rear wall of the hood 22 is a bracket 25 (Figs. 1, 2 and 6) having fixed therein an inwardly projecting pin 26 for rotatably supporting a reel 27 containing a supply roll 28 of photographic micro-film 29. The film 29 is drawn from the supply roll 28 downwardly and forwardly under an arm 30 and threaded between a rubber covered feed roller 31 and a cooperating flanged pressure roller 32 formed of a suitable plastic material, such as Tenite, said rollers acting to positively advance the film 29 without scratching or injuring the same. The flanges of the roller 32 receive the roller 31 and film 29 therebetween and thus serve to maintain said film in a predetermined lateral position in the apparatus and to prevent lateral displacement of said film relative to said rollers during feeding movement thereof by said rollers. The feed roller 31 is fixed on a stub shaft 33 which is journalled in suitable bearings in the bracket 25. The pressure roller 32 is journalled on the arm 30 at the free forward end thereof, and said arm is pivotally mounted intermediate its ends on a stud 34 threaded into the bracket 25. Connected to the rear free end of the arm 30 is one end of a coil extension spring 35 which acts to yieldingly urge said arm and the pressure roller 32 upwardly and to apply a yielding pressure of said roller on the film 29 and feed roller 31. The opposite end of the spring 35 is connected, as at 36, to a U-shaped bracket 37 which is disposed within the base 21 and is bolted or otherwise suitably secured to the bottom wall of said base, said bracket projecting rearwardly beyond the base through the rear opened side of the latter. The feed roller shaft 33 has fixed thereon a spur pinion 38 which meshes with and is driven by a spur gear 39 that is fixed on a short transversely extending shaft 40 which is journalled in suitable bearings in the bracket 25. One end of the shaft 40 projects beyond the bracket 25 and has fixed thereon a knob 41 for manually turning said shaft and the feed roller 31 through the described gearing 38, 39 in one direction to advance or feed the film 29 or in the opposite direction to retract said film. The pressure roller 32 is rotated by the film 29 through rotation of the feed roller 31 and frictional contact of said film with said pressure roller.

It will be noted that the axis of rotation of the feed roller 31 is disposed forwardly of the axis of rotation of the companion pressure roller 32. Accordingly, when the film 29 is advanced by the rollers 31, 32 upon rotation of the roller 31 in the proper direction by means of the knob 41, said film will travel forwardly and downwardly and pass over a curved guide member 42 (Figs. 2, 3, 7, 8 and 9) and enter a shallow groove or track 43 formed in the upper downwardly inclined surface of a wedge-shaped guide block 44. The guide member 42 is suitably secured, as by machine screws or the like, to the guide block 44, and said block, in turn, is suitably secured, as by machine screws or the like, to the upper surface of a metallic auxiliary guide plate 45 which is partially embedded in the upper surface of the cover plate 24 and is bolted or otherwise suitably secured thereto. The guide block 44 is preferably formed of a plastic material, such as Plexiglas, so that the guide track 43 therein is smooth and free of abrasive action on the film 29, and that the coefficient of friction between said film and said block is at a minimum thus enabling free movement of the film along said track. The plastic material forming the guide block 44 is also preferably, but not necessarily, transparent for a purpose to be hereinafter explained. The film 29 during movement thereof along the guide block 44 is held against upward displacement from the track 43 by a cover strip 46 which is suitably secured, as by machine screws or the like, to the upper surface of said block. The cover strip 46 is preferably formed of a clear transparent plastic material, such as Plexiglas, so that the film 29 and the movement thereof along the guide block 44 may be observed therethrough. In order to further reduce the frictional surface contact of the guide block 44 on the film 29 and confine such contact to the marginal edges of said film, the guide track 43 is undercut along the entire length thereof, as indicated at 47 (Fig. 9).

The auxiliary guide plate 45 has a portion thereof projecting forwardly beyond the guide block 44, and said plate portion is provided with an undercut guide groove or track 48 (Figs. 2, 5, 7 and 8) which forms a horizontal continuation of the inclined undercut guide groove or track 43 in the guide block 44. The forwardly projecting portion of the guide plate 45 has also formed therein a centrally disposed rectangular window 49 which registers with the guide track 48, and a transversely extending slot 50 the rear wall 51 of which defines the rear edge of said window and is slightly tapered to provide a relatively sharp cutting edge on said plate. The guide block 44 is so located and constructed that the forward end thereof is substantially in vertical alignment with the cutting edge 51 on the guide plate 45, and that the guide track 43 in said block terminates substantially at said cutting edge and in the plane of the upper surface of said guide plate. It will thus appear that as the film 29 leaves the guide track 43 and guide block 44, it will immediately enter the guide track 48 in the guide plate 45 and travel along the latter track and over the window 49 and slot 50 in said plate, as shown in Fig. 8.

The portion of the film 29 extending into the guide track 48 in the guide plate 45 is held against upward displacement from said track by a cover strip 52 which is suitably secured, as by machine screws or the like, to said plate and is provided with a rectangular window 53 which registers with the window 49 in the plate 45. The cover strip 52 is preferably formed of a clear transparent plastic material, such as Plexiglas, so that the film 29 and the movement thereof along the guide track 48 may be observed therethrough.

The table or cover plate 24 is provided with a relatively large annular opening 54 therein which surrounds the windows 49 and 53 in the guide plate 45 and cover strip 52, respectively (Figs. 2, 3, 5 and 7). Disposed within the base 21 and directly below the opening 54 in cover plate 24 is an electrical projection lamp 55 which is connected with a suitable source of electrical current and is illuminated under the control of suitable electrical switch means (not shown). The lamp 55 is removably carried by a suitable socket 56 bolted or otherwise suitably secured to an angle bracket 57 which, in turn, is bolted or otherwise suitably secured to the cover plate 24. Disposed below the cover plate 24 and directly above the lamp 55 is a suitable condenser lens 58 which is carried in a holder 59 that is bolted or otherwise suitably secured to the angle bracket 57. Spaced a suitable distance above the cover plate 24 and located within the hood 22 and in direct axial alignment with the condenser lens 58 is a suitable projecting lens 60 which is fixed in a cylinder 61. This cylinder 61 is slidably mounted in a bracket 62 to enable vertical adjustment of the projecting lens 60 relative to said bracket toward and away from the cover plate 24 for film focusing purposes. The bracket 62 is bolted or otherwise suitably secured to the cover plate 24 at one side of the guide plate 45 and projects over said guide plate.

Located within the hood 22 is a light reflecting element 63, such as a flat mirror, which is disposed at a suitable angle to intercept the rays of light from the projecting lens 60 (Fig. 2). The reflecting element 63 is suitably mounted on a backing plate 64 which is bolted or otherwise suitably secured at opposite sides thereof to the side walls of the hood 22. The light rays received from the projecting lens 60 by the reflecting element 63 are reflected forwardly onto a suitable translucent viewing screen 65 which is located at the front of the hood 22 and is inclined towards said reflecting element. The hood 22 is opened at the front thereof to receive and expose the screen 65, and said screen is held in position by a suitable frame 66 which is pressed in said hood.

It will thus appear that as the film 29 passes from the guide block 44 to and along the guide track 48 in the guide plate 45, the successive images on said film will successively register with the aligned openings 54, 49 and 53 and, hence, will be projected and magnified on the screen 65 by the described projector means comprising the lamp 55, condenser lens 58, projecting lens 60 and mirror 63. The operator standing at the front of the apparatus can thus easily and conveniently observe the movement of the film 29, identify the successive images, select a desired image or images, and stop the film when the portion thereof containing the selected image or images is in cutting relation to the cutting edge 51 on the guide plate 45. In order to facilitate stopping of the film 29 in accurate cutting position, the screen 65 is made larger than the magnified image projected thereon and is provided with a transverse opaque line 67 which may be formed in various ways and is so located on said screen that it coincides with the cutting edge 51 on the guide plate 45. The described location of the rollers 31 and 32 enables movement of the film 29 back and forth to insure accurate positioning of the selected portion thereof in cutting relation to the cutting edge 51, and further enables retraction of the film upon excess movement thereof, purposely or accidentally, beyond said cutting edge.

Adjustment of the projecting lens 60 for film focusing purposes may be conveniently accomplished from a convenient location exteriorly of the hood 22, and as herein shown is preferably effected by a pinion-shaft 68 (Figs. 3 and 5) which meshes with a vertically disposed rack 69 that is secured in any suitable manner to the outer surface of the lens-cylinder 61. The pinion-shaft 68 is journalled in suitable bearings in the bracket 62 and in a yoke 70, said bracket and the bearing therein being suitably grooved to slidably receive the rack 69 and enable meshing engagement of said shaft therewith. The yoke 70 is loosely engaged over a stub shaft 71 which extends at right angles to the pinion-shaft 68 and is journalled in a suitable bearing provided in the adjacent wall of the hood 22. Disposed between the parallel arms of the yoke 70 and secured to the inner end of the stub shaft 71 is a mitre gear 72 which meshes with a similar mitre gear 73 that is also disposed between said arms and is secured to the pinion-shaft 68. The stub shaft 71 projects outwardly beyond the hood 22 and has fixed thereon a knob 74 for manually turning said shaft in opposite directions and thereby raise and lower the projecting lens 60 through the described operating connections therefor with said shaft.

When a desired section of film 29 has been advanced by the rollers 31 and 32 beyond the cutting edge 51 in the guide plate 45 and has been examined and identified on the screen 65, which film section may consist of a single film frame 20 or a strip 19 of such frames, said film section is substantially disposed as shown in Fig. 8 and is severed from the supply length thereof by a knife blade 75 (Figs. 2, 3 and 5) which is disposed above the cover plate 24 and cooperates with the cutting edge 51 on the guide plate 45. This knife blade 75 is pivotally mounted, as at 76, at one end thereof on a block 77 which is suitably secured, as by a machine screw or the like, to the guide plate 45. The knife blade 75 has pivotally connected to the opposite free end thereof the upper end of a connecting link 78 which extends downwardly through a suitable clearance slot 79 formed in the cover plate 24 for said link and said knife blade. The lower end of the connecting link 78 is pivotally connected to the free end of an arm 80 fixed on a pin 81 which forms an integral part of the annular core 82 of a conventional rotary solenoid 83. The solenoid 83 is disposed within the base 21 and is suitably secured, as by machine screws or the like, to an angle bracket 84 which, in turn, is suitably secured, as by machine screws or the like, to a plate 85 that extends across the forward end of the bracket 37 and is suitably secured thereto, as by machine screws or the like. When the solenoid 83 is energized, the core 82 is drawn in a counter-clockwise direction, as viewed in Fig. 2, and thus pulls the knife blade 75 downwardly through the described connections therefor with said core, whereupon said knife blade is progressively drawn across the cutting edge 51 on the guide plate 45 and the advanced section of the film 29 is cleanly severed by a shearing action. When the solenoid 83 is deenergized, the core 82 is drawn in the opposite direction by a torsion spring (not shown) which is disposed within said solenoid, thus raising the knife blade 75 and returning the same to its original position in readiness to act on the next advanced section of the film 29. During pivotal movement of the knife blade 75, the latter is maintained in cutting relation to the cutting edge 51 on the guide plate 45 by angle guides 86 which are disposed at opposite sides of said knife blade and are suitably secured, as by machine screws or the like, to said guide plate.

Conveniently located at the front of the apparatus for actuation by the operator is a normally open push-button electrical switch 87 (Figs. 2 and 5) which is of the conventional self-resetting type and is secured in a suitable manner to one of the side walls of the base 21. Switch 87 and solenoid 83 have connected therewith lead wires 88 and 89, respectively, which are connected with a suitable source of electrical current, and said switch and solenoid are connected together by a lead wire 90 so that when the button 91 of switch 87 is pressed inwardly to close said switch the electrical circuit for said solenoid is completed to effect operation of the knife blade 75 as hereinbefore described.

After the advanced section of the film 29 is severed by the knife blade 75 from the supply length of said film, the severed film section occupies the position thereof shown in Fig. 10 wherein it will be noted that said severed section is disposed in the guide track 48 in the guide plate 45, and that the trailing end of said section is disposed below the front or outlet end of the guide track 43 in the guide block 44. Following the severance of the advanced end section of the film 29 from the supply length of said film, the severed film section is inserted into a card 15 by inserter means preferably constructed, mounted and operated as follows. Disposed forwardly of and in close proximity to the guide plate 45 and in exact longitudinal alignment with the guide track 48 in said plate is an inserter or tongue 92 (Figs. 2, 3, 4, 7 and 8). This inserter or tongue 92 is adapted to receive the severed film section directly from the guide track 48 in guide plate 45, and to also slidably receive thereover in telescopic relation a card 15 with said inserter extending more or less into a selected pocket 18 in said card, as shown in Figs. 3 and 4. Since the inserter 92 extends into the pocket 18 in a card 15, it follows that upon movement of a severed section of the film 29 through said inserter by means to be presently described, said film section will pass from the inserter directly into said card pocket. In this manner, insertion of the severed film sections of various lengths into the cards 15 is positively assured at all times and is expeditiously accomplished in a simple and reliable manner.

The inserter 92 is preferably formed of a relatively thin, smooth surfaced, highly polished metallic material, such as stainless steel or spring tempered brass, and is provided at opposite sides thereof with upwardly and inwardly turned portions 93 which are spaced from the base portion of said inserter a distance slightly in excess of the thickness of the film 29. The inserter portions 93 form a rectilinear guide track or passageway for the severed film sections, and they serve to hold said film sections against upward displacement during movement thereof along the inserter 92. Located adjacent the rear end of the inserter 92 and welded or otherwise suitably secured to the bottom surface thereof is a relatively thin mounting plate 94 by means of which said inserter is suitably secured, as by machine screws or the like, to the upper surface of the cover plate 24, said mounting plate also serving to space the inserter from said cover plate a sufficient distance to enable engagement of the cards 15 over said inserter. The base portion of the inserter 92 includes an integral lip 95 which extends rearwardly beneath the reduced forward end portion of the guide plate 45 so as to bridge any space between said guide plate and said inserter and to effectively guide the severed film sections from the guide plate into the inserter. The forward edge of the inserter 92 is preferably formed at an angle so as to facilitate entry of said inserter into the pockets 18 in the cards 15 and engagement of said cards thereover.

Normally disposed rearwardly of the cutting edge 51 on the guide plate 45 and located in the plane of and in direct longitudinal alignment with the guide track 48 in said plate is a pusher member 96 (Figs. 2, 3, 8, 9 and 10) which is in the form of a flexible steel band of substantially the same width and thickness as that of the film 29. The pusher-band 96 is slidably engaged in a guide track 97 formed in the upper surface of the guide plate 45 and which, in effect, forms a rearward continuation of the guide track 48 in said plate. From the guide plate 45 the pusher-band 96 extends rearwardly and passes around a spur gear 98 the teeth of which are received in a plurality of openings 99 formed in and spaced along a major portion of the length of said pusher-band, the size and spacing of said openings corresponding to the thickness and width and circular pitch, respectively, of said gear teeth. The gear 98 is clamped between two rubber rings 100 one of which is pressed on and cemented to an annular metallic head 101, and the other of which is pressed on and cemented to a companion annular metallic head 102. The heads 101 and 102 with the rubber rings 100 thereon and the gear 98 therebetween are secured together as a single unit by means of machine screws 103 which extend through suitable clearance openings in the head 102 and gear 98 and are threaded into suitable threaded openings in the head 101. The unit comprising the heads 101, 102, rubber rings 100, and gear 98 is fixed on a transversely extending stub shaft 104 which is journalled in suitable bearings in the bracket 37.

From the gear 98 the pusher-band 96 passes downwardly and forwardly beneath said gear, aided by an arcuate guide apron 105, and extends into and along a U-shaped guide trough 106 (Figs. 2 and 5) which is disposed within the base 21 and is suitably secured, as by machine screws or the like, to the bottom wall of said base. The guide apron 105 is secured to a transverse bar 107 which is secured to or formed integrally with the bracket 37. The pusher-band 96 is held in engagement with the gear 98 and rubber rings 100 by a flanged pressure roller 108 (Figs. 2 and 3) which is journalled on a pin 109 that is secured in the free forward end of an arm 110. This arm 110 is pivotally mounted intermediate its ends on a stud 111 which is threaded into the bracket 37. The flanges of the roller 108 receive the pusher-band 96 and the rubber rings 100 therebetween, and said roller is provided with an annular clearance groove 112 for the gear 98. Disposed below the arm 110 and engaged with the rear end thereof is one end of a coil compression spring 113 which acts to yieldingly urge said arm and the roller 108 downwardly and to apply a yielding pressure of said roller on the pusher-band 96. The opposite end of the spring 113 engages against a nut 114 which is adjustably threaded on a pin 115 that is carried by the bracket 37.

The pusher-band 96 is normally disposed in the position thereof shown in Figs. 2, 3 and 8, with the leading end thereof spaced a short distance rearwardly from the cutting edge 51 on the guide plate 45 so as not to interfere with the operation of the knife blade 75 and the severance of a film section thereby, and to permit feeding movement of the film 29 to bring a desired section of said film into cutting position. It will thus appear that when the gear 98 is rotated in a counter-clockwise direction, as viewed in Fig. 2, following the severance of an advanced section from the film 29, the pusher-band 96, through engagement of said gear therewith, will be advanced along the guide track 97 therefor, beyond the cutting edge 51, into and along the guide track 48, into and through the inserter 92 and beyond said inserter. Under these conditions, the severed film section disposed in the guide track 48 will be engaged at and along its entire rear edge by the pusher-band 96, as shown in Fig. 10, and moved by said band through and beyond the inserter 92 and inserted into the pocket 18 of the card 15 engaged over said inserter, as shown in Fig. 4. When the gear 98 is rotated in a clockwise direction after the severed film section is inserted into the card 15 by the pusher-band 96 as above described, said pusher-band will be retracted along the same path and returned to its original position, whereupon the film 29 may again be advanced to bring the next desired section of said film into position for severance by the knife blade 75 and movement by the pusher-band 96 into the same pocket 18 of the card 15 as the preceding film section, or into a different pocket in the same card, or a different card, as desired or required.

Rotation of the gear 98 in opposite directions to advance and retract the pusher-band 96 is effected by the operator from a convenient location on the apparatus, and for this purpose the shaft 104 has fixed thereon exteriorly of the bracket 37 a spur pinion 116 (Figs. 1 and 3) which meshes with and is rotated by an intermediate spur gear 117 which is journalled on a stud 118 threaded into the bracket 37. The intermediate gear 117 meshes with and is rotated by a spur gear 119 which is fixed on a transversely extending stub shaft 120. This shaft 120 is journalled in suitable bearings in the bracket 37 and in the adjacent side wall of the base 21 and projects outwardly beyond said wall and has secured thereon a knob 121 for rotating said shaft.

A rearwardly projecting cover strip 122 (Figs. 2, 3, 8 and 9), preferably of a clear transparent plastic material, such as Plexiglas, is provided for holding the pusher-band 96 against bowing upwardly beyond the level of the guide track 97 therefor in the guide plate 45 upon advancing movement of said pusher-band by the gear 98. This strip 122 is suitably secured, as by machine screws or the like, to the upper surface of the guide plate 45 and extends into a suitable groove 123 formed in the lower surface of the guide block 44.

In order to guard against accidental operation of the knife blade 75 and damaging of said blade and the pusher-band 96 through such operation when said pusher-band is in film inserting position and extends across the path of downward movement of the knife blade, and upon failure of the operator to fully retract the pusher-band, a second normally open electrical switch 124 (Fig. 2) is provided and connected in the electrical circuit for the solenoid 83 so that said switch, in addition to the push-button switch 87, must be closed to complete said circuit and effect operation of said solenoid. The switch 124 is preferably of the conventional micro type having contacts therein which require a movement of only a few thousandths of an inch in making and breaking contact. As shown in Fig. 2, the micro-switch 124 is disposed within the base 21 and is so positioned that it is actuated or closed by the pusher-band 96 and only when said pusher-band is in its fully retracted position and the leading or film engaging end thereof is withdrawn clear of the cutting edge 51 and the path of downward movement of the knife blade 75, as shown, thus rendering the electrical circuit effective to energize the solenoid 83 and thereby actuate the knife blade 75 upon closing of the push-button switch 87. When the pusher-band 96 is advanced to insert a severed section of film into a card 15, said pusher-band leaves the micro-switch 124 and the contacts of said switch immediately open automatically, thus rendering the electrical circuit for the solenoid 83 ineffective and preventing operation of the knife blade 75 as long as any portion of the pusher-band is disposed in the path of downward movement of the said knife blade and until said pusher-band is fully retracted as above explained. For this purpose, the micro-switch 124 has pivotally mounted thereon a pendulum 125 which extends into the path of return movement of the pusher-band 96, as shown in broken lines in Fig. 2, and is adapted to actuate the plunger 126 of the switch and thereby close the contacts of said switch upon movement of said pendulum by said pusher-band from the broken line position to the full line position. When the pusher-band 96 is advanced and the pendulum 125 is released thereby, the contacts of the micro-switch 124 automatically open, thus causing the plunger 126 to move outwardly and thereby swing the pendulum from its full line position to its broken line position. The micro-switch 124 is secured in a suitable manner to the base 21, and the wire 90 leading from the push-button switch 87 to the solenoid 83 is broken and connected to said micro-switch so that the latter forms a part of the electrical circuit for said solenoid. Excessive upward bowing of the pusher-band 96 in the vicinity of the micro-switch 124 is prevented by an inclined block 127 which is disposed within and secured to the guide trough 106, said block also serving to direct said pusher-band beneath the same and toward said switch.

It is to be noted that since the guide block 44 and cover strips 46 and 122 are formed of a clear transparent material, the pusher-band 96, in the assembling of the apparatus, can be observed through said elements and, hence, the locating of said pusher-band in proper position to insure accurate operation thereof is materially facilitated. Additionally, the transparency of the elements 44, 46 and 122 enables the operator to periodically check the position, condition and operation of the pusher-band 96.

Referring now to Fig. 12 of the drawings which illustrates another embodiment of the present invention, the film inserting apparatus therein shown is the same in all substantial respects as the film inserting apparatus hereinbefore described and illustrated in Figs. 1 to 10, inclusive, of the drawings, except that the previously described hood 22, the projector means comprising the condenser lens 58 and the projecting lens 60, and the mounting and adjusting means for said lenses are eliminated so as to materially simplify the structure and to provide a less expensive film inserting apparatus for use in situations wherein projection of the film is neither necessary nor desirable, such as for example, in connection with film wherein the images include a visible identification code number or the like. In this second embodiment, the lamp 55 is retained, but may be replaced by a similar lamp of a lower wattage, and in place of the hood 22 a suitable bracket 130 is bolted or otherwise suitably secured to the upper surface of the previously described base 21 to provide a comparable mounting means for the previously described bracket 25 on which the previously described elements for holding the film supply reel 27 and for feeding the film are mounted. Except for these differences, the construction and operation of the film inserting apparatus of the second embodiment is the same in every respect as that of the previously described film inserting apparatus of the first embodiment, and as such is the case, the various parts are identical in construction, mounting and operation and, hence, have the same reference characters applied thereto. A detail description of the operation of the apparatus of the second embodiment is therefore unnecessary except to point out that as the film 29 is fed forwardly along the guide track 43 in the transparent guide block 44, said film is clearly visible through the transparent cover strip 46 on said block and, hence, the operator standing at the front of the apparatus can readily observe the successive images, particularly the code numbers therefor. Because of the transparency of the guide block 44, the surrounding normal light is transmitted through the same and hence, the visibility of the film passing over said block is increased. As the film 29 is further advanced beyond the guide block 44 into and along the guide track 48 in the guide plate 45, the cutting edge 51 on said plate is clearly visible through said film and the latter is illuminated by the lamp 55. The operator can thus readily observe the code numbers on the film and stop the latter with the selected section thereof in accurate cutting position. Thereupon the knife blade 75 is operated, and the severed film section is advanced through the inserter 92 and inserted into the card 15 by the pusher-band 96 as previously described.

Although the foregoing specification and the accompanying drawings set forth with more or less particularity two embodiments of the present invention, it is to be understood that said invention is not limited to said embodiments or to the particular type of film holder disclosed. Various changes may be made therein, particularly in the design, arrangement and mode of operation of the parts illustrated without departing from the spirit and scope of the invention as will now be clear to those skilled in the art. For example, the hood 22 may be eliminated, as described in connection with the second embodiment, but the projector means retained and so arranged that the film is projected on a separate screen divorced entirely from the apparatus, and the projecting lens 60 may be arranged so that it can be removed or displaced to an inoperative position when projecting of the film is not desired or necessary. Additionally, the film severing knife 75 may be manually operated, thus eliminating the described electrical actuating means therefor, and a sprocket or pin-type of rotary member may be used in lieu of the gear 98 for operating the pusher-band 96.

What is claimed is:

1. Apparatus for inserting photographic film and the like between the plies of multi-ply planar holders therefor, comprising a generally horizontal elongated inserter member arranged to receive a holder thereover in telescopic relation, said inserter member having a film passageway extending along the top thereof, a guide plate arranged rearwardly of and adjacent to said inserter member and having a track extending along the top thereof and aligned with said passageway, said guide plate having a slot therein extending transversely of said track and disposed a predetermined distance from the front edge of said plate, one transverse edge of said slot constituting a cutting edge, a wedge-shaped guide block overlying the portion of said guide plate and said track extending rearwardly of said slot and disposed so that the upper surface thereof is inclined downwardly toward said slot, said guide block having a film track extending along said surface in vertical alignment with said guide-plate-track and terminating substantially in the plane of said guide plate, rotary means for feeding a supply strip of the film along said guide-block-track and for advancing an end section of said strip over said slot and along said guide-plate-track, a pivotally mounted knife disposed above and extending transversely of said guide plate in alignment with said cutting edge and operable toward said plate and past said cutting edge for severing said end section from said film supply strip, a flexible pusher-strip disposed between said guide plate and said guide block and slidably engaged in said guide-plate-track, a rotary member engaged with said pusher-strip and operable to advance said pusher-strip from a normal retracted position spaced rearwardly from said slot whereby the severed film section is engaged at the rear edge thereof by said pusher-strip and moved through said passageway and beyond said inserter member into said holder, and means for rotating said rotary member in opposite directions to advance and retract said pusher-strip.

2. Apparatus as defined in claim 1, wherein said guide plate is provided with an opening in the track-portion thereof receiving the end section of the film supply strip, and comprising a projector including a light source and a condenser lens arranged below said plate and aligned with said opening and a projecting lens arranged above said plate and aligned with said opening and said condenser lens, a hood enclosing said projecting lens, a viewing screen at the front of said hood, a light reflecting element disposed in said hood and in the optical path of said projecting lens, said projector and said light reflecting element cooperating to project the portion of the film supply strip advanced beyond said cutting edge onto said screen whereby the end section of said film strip to be severed and inserted can be observed and selected, means on said hood and operatively connected with said projecting lens for adjusting the same toward and away from said guide plate, and line-marker means on and extending transversely of said screen and coinciding with said cutting edge whereby the line of severance of the end section of the film supply strip can be observed and determined.

3. Apparatus as defined in claim 1, wherein said guide plate is provided with an opening in the track-portion thereof receiving the end section of the film supply strip, and comprising a source of light located below said plate for illuminating through said opening the portion of said film strip advanced beyond said cutting edge whereby the end section of the film supply strip to be severed and inserted and the line of severance thereof can be observed and selected.

4. Apparatus as defined in claim 1, comprising a transparent cover strip overlying said guide block, and a transparent cover strip overlying the portion of said guide plate receiving the end section of the film supply strip.

5. Apparatus as defined in claim 1 wherein said guide block is formed of a transparent material.

6. Apparatus as defined in claim 1, comprising a rotary solenoid, connections between said knife and said solenoid and actuated by the latter for moving said knife into cutting relation with the film supply strip and said cutting edge, and a normally open manually operated switch electrically connected with said solenoid to energize the same.

7. Apparatus as defined in claim 6, comprising a second switch electrically connected with said manually actuated switch and with said solenoid and controlled by the pusher-strip so as to prevent operation of said solenoid while said pusher-strip extends across said cutting edge and across the path of movement of said knife and to permit operation of said solenoid when said pusher-strip is disposed in the said retracted position thereof.

8. Apparatus as defined in claim 7 wherein the rotary member is disposed below and between the opposite ends of said pusher-strip and the trailing portion of the latter passes around said member and extends substantially in the same direction as the leading portion of said pusher strip, and said second switch is arranged to be engaged by the end of said trailing pusher-strip-portion and closed only when the active film engaging end of said leading pusher-strip-portion is disposed clear of said cutting edge and the path of movement of said knife, and comprising roller means for yieldingly holding said pusher-strip in operative engagement with said member.

9. Apparatus for inserting photographic film and the like between the plies of multi-ply planar holders therefor, said holders being open at least at one end thereof and closed at the opposite sides thereof, comprising a generally horizontal elongated inserter member arranged to receive a holder thereover in telescopic relation at one end thereof, said inserter member having a film passageway extending along the top thereof, a guide plate arranged adjacent the other end of said inserter member and having a film track extending along the top thereof and longitudinally aligned with said passageway, rotary means for feeding an end section of a supply strip of the film in a direction longitudinally of said inserter member onto and along said track, film severing means including a knife extending in a direction transversely of said inserter member and disposed above and operable toward said guide plate for severing said end section from the film supply strip, an elongated pusher member normally disposed in retracted position rearwardly of said film severing means and operable in a direction longitudinally of said inserter member to engage the severed film section at the rear edge thereof and move said section along said track and said passageway and beyond said inserter member into said holder, means actuated by an electrical circuit for operating said knife, a normally open electrical switch in said circuit and arranged to be manually actuated to effect actuation of said knife operating means, a second electrical switch in said circuit controlled by said pusher member so as to render said circuit effective and permit operation of said knife operating means when said pusher member is disposed in said retracted position thereof and to render said circuit ineffective and prevent operation of said knife operating means while said pusher member is disposed across the path of movement of said knife, means for advancing and retracting said pusher member, and means for guiding said pusher member for rectilinear advancing and retracting movement in the plane of said track.

10. Apparatus as defined in claim 9 wherein said second electrical switch is of the normally open type and is disposed in the path of return movement of the pusher member for closing thereby only when the active film engaging end of said pusher member is disposed clear of the path of movement of the knife.

11. Apparatus for inserting photographic film and the like between the plies of multi-ply planar holders therefor, said holders being open at least at one end thereof and closed at the opposite sides thereof, comprising, a generally horizontal elongated inserter member arranged to receive a holder thereover in telescopic relation at one end thereof, said inserter member having a film passageway extending along the top thereof, a guide plate arranged adjacent to the other end of said inserter member and having a film track extending along the top thereof and longitudinally aligned with said passageway, rotary means for feeding an end section of a supply strip of the film in a direction longitudinally of said inserter member onto and along said track, film severing means including a knife extending in a direction transversely of said inserting member and disposed above and operable toward said guide plate for severing said end section from the film supply strip, an elongated pusher member normally disposed in retracted position rearwardly of said film severing means and operable in a direction longitudinally of said inserter member to engage the severed film section at the rear edge thereof and move said section along said track and said passageway and beyond said inserter member and into said holder, said pusher member being in the form of a flexible strip of a predetermined length and of substantially the same width and thickness as that of the film and having a plurality of openings therein spaced along the same, means for advancing and retracting said pusher member comprising a rotary toothed member engaged in said openings and disposed below and between the opposite extremities of said pusher-strip and whereby the trailing portion of the latter passes around said member, yieldable means for holding said pusher-strip in operative engagement with said rotary member, and means for guiding said pusher member for advancing and retracting movement in the plane of the track.

12. Apparatus as defined in claim 11 wherein said rotary toothed member is in the form of a spur gear of a relatively thin face width and the openings in the pusher-strip are of a size and spacing corresponding to the width, thickness and circular pitch of the teeth of said gear, and comprising rubber rollers engaged by said pusher-strip and coaxially disposed on opposite sides of said gear and rotatably connected therewith.

References Cited in the file of this patent

UNITED STATES PATENTS

| | | |
|---|---|---|
| 964,077 | Williams et al. | July 12, 1910 |
| 1,151,792 | Jaeger | Aug. 31, 1915 |
| 1,661,816 | Ciccone | Mar. 6, 1928 |
| 1,963,831 | Coyne et al. | June 19, 1934 |
| 2,528,754 | Johnson | Nov. 7, 1950 |
| 2,555,218 | Bailey | May 29, 1951 |
| 2,561,853 | Glow et al. | July 24, 1951 |
| 2,588,087 | Connors | Mar. 4, 1952 |